(12) United States Patent  (10) Patent No.: US 8,162,114 B2
Shirataki et al.  (45) Date of Patent: Apr. 24, 2012

(54) ROLLER-TYPE ONE-WAY CLUTCH

(75) Inventors: Hirobumi Shirataki, Fukuroi (JP);
Shinya Okuma, Fukuroi (JP);
Tomoharu Ando, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 531 days.

(21) Appl. No.: 12/445,952

(22) PCT Filed: Mar. 17, 2008

(86) PCT No.: PCT/JP2008/055355
§ 371 (c)(1),
(2), (4) Date: Apr. 17, 2009

(87) PCT Pub. No.: WO2008/123166
PCT Pub. Date: Oct. 16, 2008

(65) Prior Publication Data
US 2010/0314211 A1    Dec. 16, 2010

(30) Foreign Application Priority Data

Mar. 20, 2007 (JP) .................................. 2007-072559
Feb. 15, 2008 (JP) .................................. 2008-034418

(51) Int. Cl.
*F16D 3/34* (2006.01)
(52) U.S. Cl. ........................................................ 192/45
(58) Field of Classification Search ............... 192/45, 192/44, 38; 188/82.84
See application file for complete search history.

(56) References Cited

U.S. PATENT DOCUMENTS

| | | | |
|---|---|---|---|
| 1,708,215 A | 4/1929 | Chryst | |
| 2,843,238 A | 7/1958 | Rozner | |
| 3,011,606 A * | 12/1961 | Ferris et al. | 192/45 |
| 5,271,486 A * | 12/1993 | Okamoto et al. | 192/45 |
| 5,941,355 A | 8/1999 | Iga | |
| 2004/0139743 A1* | 7/2004 | Sato | 60/345 |
| 2007/0251794 A1* | 11/2007 | Shirataki et al. | 192/45 |
| 2009/0242346 A1* | 10/2009 | Kinoshita | 192/45 |
| 2010/0096236 A1* | 4/2010 | Ando | 192/45 |
| 2010/0116611 A1* | 5/2010 | Shirataki et al. | 192/45 |
| 2010/0258398 A1* | 10/2010 | Shirataki et al. | 192/45 |

FOREIGN PATENT DOCUMENTS

| | | |
|---|---|---|
| DE | 29 28 587 A1 | 1/1981 |
| EP | 0 237 243 A1 | 9/1987 |
| JP | 2003-172377 A | 6/2003 |
| TW | 354820 | 3/1999 |
| TW | I264503 B | 10/2006 |

* cited by examiner

*Primary Examiner* — David D Le
*Assistant Examiner* — Lillian Nguyen
(74) *Attorney, Agent, or Firm* — Miles & Stockbridge P.C.

(57) ABSTRACT

A roller-type one-way clutch includes an outer race with a pocket with a cam surface, an inner race, and a plurality of rollers disposed on the pocket, engaged in the cam surface, and transmitting torque between the outer race and the inner race. The clutch further includes a cage provided with a cylindrical part and a window provided in the cylindrical part, holding the plurality of rollers, and a spring provided on the pocket, one end of which is latched to the outer race, and the other end of which is configured for preventing movement of the rollers in the axial direction. The spring energizes the rollers in the engagement direction with the cam surface, and the cage is configured so that it is prevented from dropping off in the axial direction.

21 Claims, 7 Drawing Sheets

ROLLER-TYPE ONE-WAY CLUTCH

TECHNICAL FIELD

The present invention relates to a roller-type one-way clutch for use as a part, for example, for torque transmission, back stop or the like in the drive unit of an automobile, industrial machine, or the like.

BACKGROUND ART

Generally, a roller-type one-way clutch has an outer race, an inner race disposed concentrically with the outer race, a plurality of rollers disposed between the outer peripheral surface of the inner race and the inner peripheral cam surface of the outer race and transmitting a torque, a spring in contact with an idle rotation side of the rollers, and others.

In such a configuration, the one-way clutch allows the inner race to rotate only in one direction with respect to the outer race by a cam mechanism which is made up of rollers and a cam surface. That is, the inner race is idly rotated in one direction with respect to the outer race and gives a rotational torque to the outer race through the cam mechanism only in the opposite direction.

In general, the roller-type one-way clutch must have some kind of contrivance to prevent rollers as torque transmission members, or a spring that energizes the roller and others from dropping off from a pocket in an axial direction and in a radial direction in order to secure definite engagement.

In particular, since in a roller-type one-way clutch for two-wheelers, the number of rollers is small (for example, 3 or 6 rollers), there is a possibility of failure to achieve the designed torque capacity unless each roller is securely engaged with each other.

In Japanese Patent Application Laid-Open No. 2003-172377, a holding part is provided to the pocket so that rollers or springs do not drop off to the inner peripheral side of the outer race. However, it does not indicate to prevent them from dropping off in the axial direction. In general, by installing a side plate to the one-way clutch, drop-off in the axial direction is prevented.

The use of the side plate increases the number of components, assembly processes, etc., and may complicate the construction. Therefore, the roller-type one-way clutch that can prevent rollers and springs from dropping off in the axial direction and in the radial direction, without requiring a side plate, has been desired.

DISCLOSURE OF THE INVENTION

An object of the present invention is to provide a roller-type one-way clutch that can prevent drop-off of rollers and springs in the axial and radial directions without using any side plate, and in which rollers are definitely engaged with each other.

To achieve the above object, the roller-type one-way clutch of the present invention is a roller-type one-way clutch, having:

an outer race with a pocket with a cam surface formed on an inner surface;

an inner race separated to the radial inside diameter side with respect to the outer race, disposed concentrically and relatively rotatable, and having an annular outer peripheral raceway surface;

a plurality of rollers disposed on the pocket, engaged in the cam surface, and transmitting torque between the outer race and the inner race;

a cage provided with a cylindrical part, and a window provided in the cylindrical part, holding the plurality of rollers, and having a circumferential width which is smaller than the roller diameter;

a spring disposed on the pocket, one end of which is latched to the outer race, the other end of which has roller movement preventive means for preventing the movement of the rollers in the axial direction, and which energizes the rollers in the engagement direction with the cam surface, wherein the cage has cage movement preventive means for preventing the cage from dropping off in the axial direction toward the opposite side to the other end of the spring in the axial direction.

To achieve the above object, the roller-type one-way clutch of the present invention is a roller-type one-way clutch, having:

an outer race with a pocket that has a cam surface on an inner surface;

an inner race separated to the radial inside diameter side with respect to the outer race, disposed concentrically and relatively rotatable, and having an annular outer peripheral raceway surface;

a plurality of rollers disposed on the pocket, engaged in the cam surface, and transmitting torque between the outer race and the inner race;

a cage provided with a cylindrical part and a flange part extending from the cylindrical part to the outside diameter direction, and having a window provided in the cylindrical part and holding the plurality of rollers; and a spring disposed on the pocket, one end of which is latched to a ring and the other end of which is held between the roller, the flange part of the cage, and which energizes the roller in the engagement direction with the cam surface, wherein the cage is rotatable relative to the outer race, and the circumferential width of the window is smaller than the roller diameter.

Further, the roller movement preventive means is an end of the spring which is curved to contact an end face in the axial direction of the roller.

Further, the one end of the spring is secured to the outer race.

Further, the one end of the spring is secured to the outer race by welding.

Further, the one end of the spring is secured to the outer race by soldering.

Furthermore, the one end of the spring is secured to the outer race by bonding.

Further, the one end of the spring is secured to the outer race by spot welding.

Further, the cage movement preventive means is a flange formed on the cage.

Further, the cage movement preventive means is one or more extension parts extended from the cage to the outside diameter direction.

Furthermore, the annual shoulder is installed at the axial edge of the inner circumferential surface of the outer race, and with the shoulder, the cage movement preventive means engages.

Further, the one-way clutch is mounted on a relative member of the end face in the axial direction on which the cage movement preventive means is formed.

According to the roller-type one-way clutch according to the present invention, the following effects are obtained.

Since drop-off of rollers or springs themselves in the axial direction can be prevented by the springs, a conventionally required side plate is no longer necessary, and the number of components can be reduced. Consequently, since the side plate is no longer required, the clutch-width can be taken that much, resulting in an increased torque. In addition, the construction can be simplified and assembly of the one-way clutch becomes easy.

Since the roller movement preventive means for preventing the movement of the roller in the axial direction, is installed on one end of the springs, the movement of the roller in the axial direction is limited. By this, as the roller fitted into the window of the cage is moved in the axial direction, it is possible to prevent the cage from being moved in the axial direction.

Since the cage movement preventive means, which is on the opposite side to the roller movement preventive means in the axial direction and which prevents the cage from dropping off in the axial direction on the opposite side to the other end of the spring in the axial direction, is formed in the cage, it is possible to prevent the movement of the cage in both axial directions. That is, the movement of the cage is prevented by the roller movement preventive means in one direction of the axial direction, and by the cage movement preventive means in the other direction of the axial direction.

Further, since one end of the spring is secured to the outer race, and the other end is bent to the roller side and is used as the roller movement preventive means, it is possible to fix the spring and prevent the movement of the roller in the axial direction by an inexpensive and easy processing.

Further, it is possible to easily form the cage movement preventive means by forming the flange part or extension part on the cage, or installing a retaining ring on the cage.

Further, since the circumferential width of the window of the cage is smaller than the roller diameter, it is possible to prevent the roller from dropping off in the radial direction when the clutch is being conveyed. That is, the drop-off of rollers in the inside diameter side can be prevented even before installing the inner race, and due to the synergetic effect of forming the cage movement preventive means, there is not a case that the roller is dropped off even when the clutch is conveyed without installing the inner race. Thus, the installation of the inner race is also easily achieved.

Further, since the roller-type one-way clutch is installed on the relative member on the side where the cage movement preventive means is formed, it is possible to prevent the cage, roller and spring from falling out in the axial direction during their use.

Further, a free relative rotation of the cage with respect to the outer race enables to definitely actuate the roller-type one-way clutch, without obstructing the movement of the roller, even if the circumferential width of the window of the cage is smaller than the roller diameter.

Since annular shoulders with which a flange part of the cage engages are installed to the edge part in the axial direction of the inner surface of the outer race, it is not necessary to reduce the axial length of the outer race as much as the thickness of the flange part, and the axial length of the outer race can therefore be secured.

In addition, since dropping-off of rollers or springs can be prevented in the axial and radial directions, all the rollers definitely engage with each other even in environmental conditions with large vibration such as two-wheelers, etc.

BEST MODES FOR CARRYING OUT THE INVENTION

An embodiment of the invention will hereinafter be described in detail with reference to the drawings. The embodiment which will hereinafter be described is one which exemplarily illustrates the present invention, and other modifications are of course possible.

Figure 1:
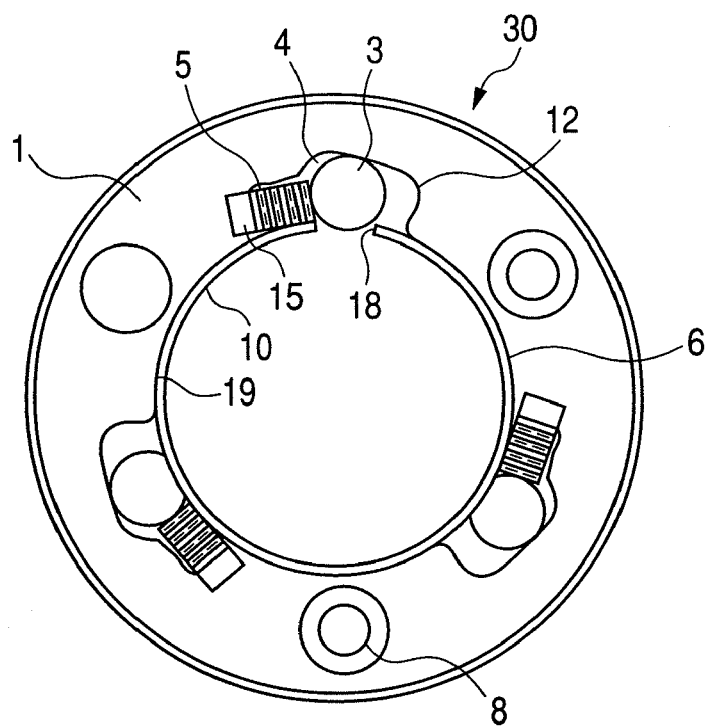
FIG. 1 is a front view that shows a roller-type one-way clutch according to an embodiment of the present invention and shows the condition before engaging.
Figure 2:
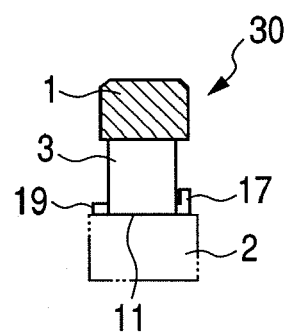
FIG. 2 is a cross-sectional view taken on line A-A of FIG. 3.
Figure 2:
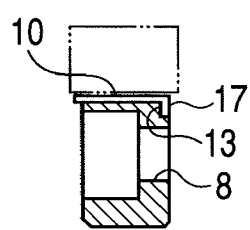
Figure 3:
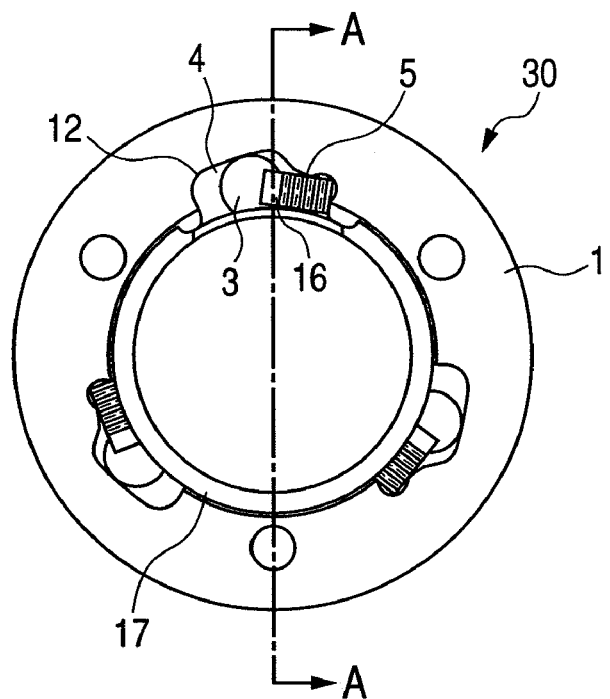
FIG. 3 is a front view as seen from the rear side of FIG. 1.

FIG. 1 is a front view showing a roller-type one-way clutch according to an embodiment of the present invention. FIG. 3 is a front view as viewed from the rear side of FIG. 1. FIG. 2 is a cross-sectional view taken on the line A-A of FIG. 3.

FIGS. 1 to 3 show the state before rollers engage with each other, that is, the idling state in which the one-way clutch is not locked. In the case of the present embodiment, an inner race 2 is idling.

As shown in FIG. 1, a roller-type one-way clutch 30 has an annular outer race 1 provided, at its inner circumference, with a pocket 4 formed as a recessed part with a cam surface 12, an inner race 2 (illustrated in an imaginary line in FIG. 2) separated to the radial inside diameter side with respect to the outer race 1, disposed concentrically to be rotatable relatively, and having an annular outer peripheral raceway surface 11, a plurality of rollers 3 disposed on the pocket 4, which transmit torque between the outer peripheral raceway surface 11 and the cam surface 12 of the inner race 2, and a cage 6 that holds the plurality of rollers 3. The cage 6 is not fixed to either of the outer race 1 and the inner race 2, and rotatable relative to the outer race 1 and the inner race 2.

The pocket 4 installed to the outer race 1 is provided at 3 places equally spaced in the circumferential direction. Furthermore, a shoulder bolt hole 8 used for fixing the outer race 1 to not-illustrated input/output members, etc. and penetrating in the axial direction is provided at 3 places equally spaced in the circumference direction also. As shown in FIG. 1, pockets 4 and bolt holes 8 are placed alternately at regular intervals. In addition, needless to say, the number of pockets 4 can be set in a plurality, for example, 3 through 6 pieces in accordance with the size of toque.

As shown in FIGS. 2 and 3, the cage 6 which holds the rollers 3 is provided with a cylindrical part 10 and an annular flange part 17 which extends from one axial end of the cylindrical part 10 to the outside diameter direction. In addition, the cage 6 has a window 18 which corresponds with the number of the rollers 3 and penetrates in the radial direction. Meanwhile, in FIG. 3, the flange part 17 is shown partly broken away to show the pocket 4.

As shown in FIGS. 1 and 3, the roller-type one-way clutch 30 has a spring 5 disposed to the pockets 4, which energize the rollers 3 in the direction to engage with the cam surface 12.

One end of the spring, that is, a tab 15, is secured to the end face in the axial direction of the outer race 1 as shown in FIG. 1, and the other end, that is, a tab 16, is held between the axial end face of the roller 3 and the flange part 17 of the cage 6 as shown in FIG. 3. With this configuration, the spring 5 itself is supported to the outer race 1 in a fixed state and at the same time, the tab 16 functions as the roller movement preventive means for preventing the roller 3 from being moved and dropping off in the axial direction.

The tab 15, which is one end of the spring 5, can be secured to the outer race 1 by welding, soldering, bonding, spot welding and the like.

The spring 5 used in the present invention is an accordion spring, but it is possible to use a coil spring and springs of other shapes.

A window 18 provided in the cylindrical part 10 of the cage 6 penetrates in the radial direction, but in the axial direction, the flange part 17 side is closed at the end 19 side opposite to the flange part 17 also. That is, the roller 3 is seated in the substantially rectangular window 18 and is supported by four sides of the window 18. In order to show the relationship between the window 18 and the roller 3, in FIG. 1 (in FIG. 4 discussed later, also), the uppermost window 18 in the figure is shown with the end 19 broken away.

Since the roller 3 has one end in the axial direction supported by the tab 16 of the spring 5 and one side of the window 18 and the other end by one side of the window 18, dropping-off in the axial direction is prevented. At this time, providing a protrusion, etc., to the tab 16 to slightly press the axial end face of the roller 3 allows the roller 3 to be more reliably held inside the window 18.

As shown In FIGS. 2 and 3, an annular shoulder 13 is installed at the axial edge of the inner circumferential surface of the outer race 1, and with the shoulder 13, the flange part 17 of the cage 6 engages. The axial depth of the shoulder 13 is made slightly larger than the thickness of the flange part 17, and when the flange part 17 engages with the shoulder 13, the axial end face of the outer race 1 becomes flush with the axial end face of the flange part 17. The flange part 17 functions as the cage movement preventive means for preventing the cage 6 from dropping-off in the axial direction by engaging with the shoulder 13 of the outer race 1. Since the outside diameter of the shoulder 13 is slighter larger than the outside diameter of the flange part 17 of the cage 6, a minute clearance is present in the radial direction between the shoulder 13 and flange part 17.

Consequently, since it is no longer necessary to reduce the axial length of the outer race 1 by the thickness of the flange part 17, the axial length of the outer race 1 can be sufficiently secured, and an extra allowance is provided in the engaging allowance of the cam surface 12 and the roller 3. Furthermore, the axial length can be shortened without varying the rigidity on the side of the cam surface 12 of the outer race 1.

Figure 12:
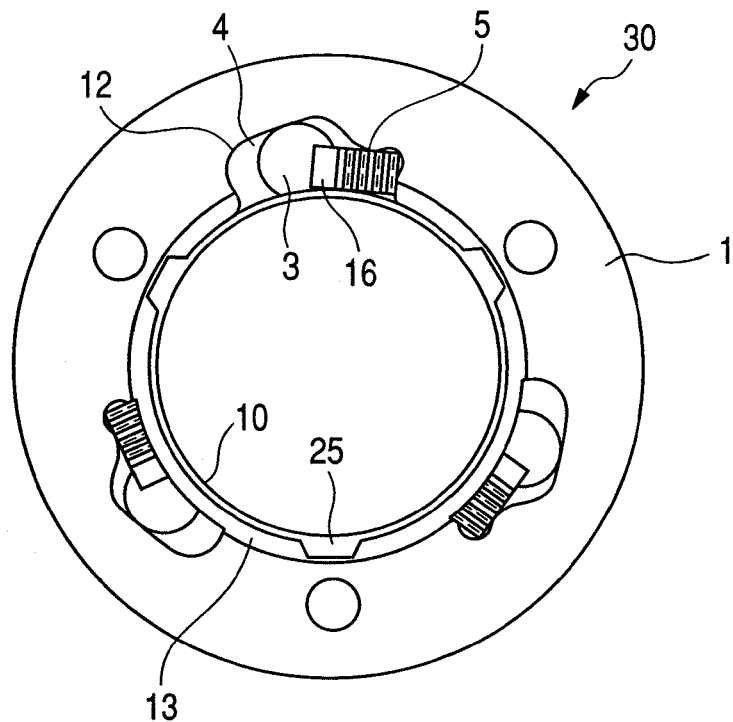
FIG. 12 is a front view that shows a roller-type one-way clutch as a variant of the embodiment according to the present invention, showing the condition before engaging.

FIG. 12 is a front view that shows a roller-type one-way clutch as a variant of the embodiment according to the present invention, showing the condition before engaging. In this example, the extension part 25 extending from one end of the cage 6 in the axial direction to the outside diameter direction is formed instead of forming the annular flange part 17 on the cage 6. The extension part 25 is, as illustrated, provided at 3 places equally spaced in the circumferential direction.

The extension part 25 is, like the flange part 17, functions as the cage movement preventive means for preventing the cage 6 from dropping-off in the axial direction by engaging with the shoulder 13 of the outer race 1. The extension part 25 has a height equal to the flange part 17 in the radial direction. Also, the circumferential width or the number of the extension part 25 can be arbitrarily set as needed. At least one extension part 15 needs to be formed.

The cage 6 is installed on the relative member (not illustrated) in the axial end face in which the flange part 17 or extension part 25 is formed. Because of this, the movement of the cage 6 is prevented by the relative member in the axial one end on which the flange part 17 or extension part 25 is formed, and is prevented by the flange part 17 or extension part 25 in the opposite end. Accordingly, drop-off of the cage to any side of the axial direction does not occur. Also, since the roller-type one-way clutch 30 is installed on the relative member on the side where the cage movement preventive means is formed, it is possible to prevent the cage 6, roller 3, and spring 5 from falling out in the axial direction during their use.

Since the flange part 17 or extension part 25, which is on the opposite side to the tab 16 as the roller movement preventive means in the axial direction and which functions as the cage movement preventive means for preventing the cage 6 from dropping off on the opposite side of the other end of the spring 5 in the axial direction, is formed in the cage 6, it is possible to prevent the movement of the cage 6 in both axial directions. That is, the movement of the cage 6 is prevented by the tab 16 in one of the axial directions, and in the other of the axial directions, by the flange part 17 or extension part 25.

Figure 13:
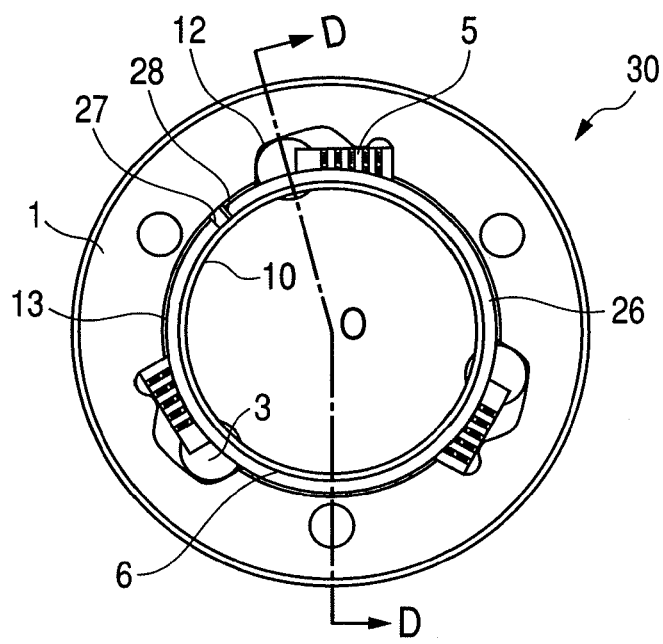
FIG. 13 is a front view that shows a roller-type one-way clutch as another a variant of the embodiment according to the present invention, showing the condition at the time of engaging.
Figure 14:
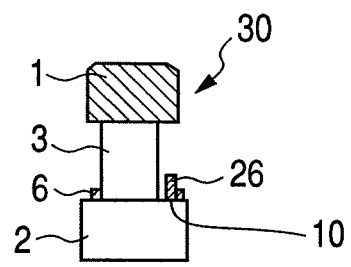
FIG. 14 is a cross-sectional view taken on line D-O-D of FIG. 13.
Figure 14:
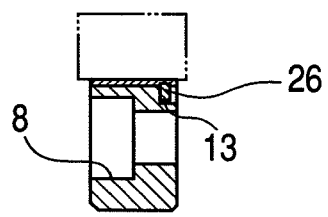
Figure 15:
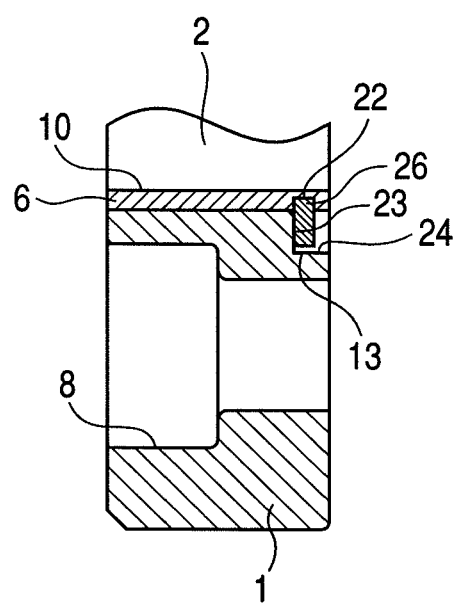
FIG. 15 is a partially enlarged view of FIG. 14.

As another example of the cage movement preventive means, the retaining ring installed on the cage can also provide the same effects. FIGS. 13 to 15, as another variant, show examples of forming the retaining ring on the cage. FIG. 13 shows a front view, FIG. 14 is a cross-sectional view of the axial direction taken on line D-O-D of FIG. 13, and FIG. 15 is a partially enlarged view of FIG. 14.

FIG. 13 is a front view that shows the roller-type one-way clutch as another variant according to the embodiment of the present invention, showing the condition at the time of engaging. Its basic constitution is identical to those of FIGS. 1 and 12. In the present example, the cage 6 is only provided with the cylindrical part 10, and the flange part 17 or extension part 25 is not formed. An annular groove 22 is formed at an outer peripheral surface of the cylindrical part 10 around the edge part in the axial direction on which the flange part 17 or extension part 25 is formed in the other example.

The retaining ring 26 has two edge parts 27 and 28, and a predetermined gap is formed between the edge part 27 and the edge part 28. Also, as can be seen from FIG. 14, the retaining ring 26 is fitted into the groove 22. The retaining ring 26 is engaged to the shoulder 13 of the outer race 1 so as to be in contact with each other.

The retaining ring 26 will be explained in detail in FIG. 15 which is a partially enlarged drawing of FIG. 14. The retaining ring 26 fitted into the groove 22 of the cage 6, has a predetermined width in the outside diameter direction. As the retaining ring 26 is in contact with the shoulder 13 of the outer race 1, drop-off of the cage 6 in the axial direction on the opposite side to the tab 16 of the spring 5 with respect to the axial direction is prevented, like the flange part 17 and extension part 25.

As shown in FIGS. 13 to 15, a clearance is formed between the outermost diameter end 23 of the retaining ring 26 and the extreme outermost surface 24 of the shoulder 13. Because of this, the retaining ring 26 limits the movement of the cage 6 in the axial direction but does not control the relative rotation with the outer race 1. Accordingly, the cage 6 and the outer race 1 are relatively rotatable.

Figure 4:
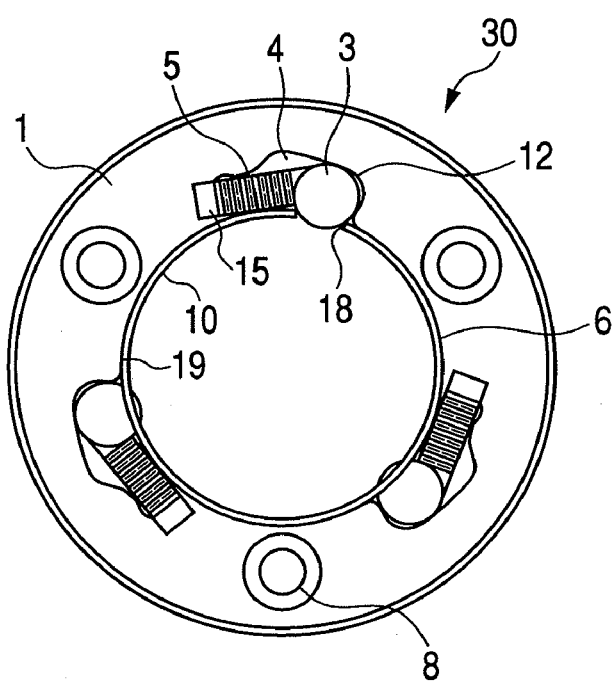
FIG. 4 is a front view that shows the roller-type one-way clutch according to the embodiment of the present invention, showing the condition at the time of engaging.
Figure 5:
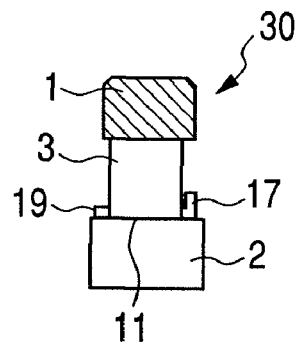
FIG. 5 is a cross-sectional view taken on line B-B of FIG. 6.
Figure 6:
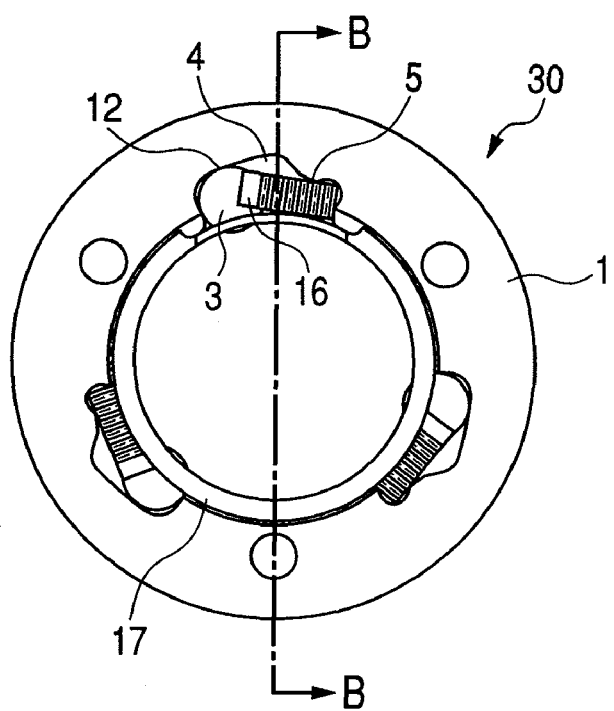
FIG. 6 is a front view as seen from the rear side of FIG. 1.

FIG. 4 is a front view that shows a roller-type one-way clutch of the embodiment of the present invention and FIG. 6 is a front view as viewed from the rear side of FIG. 4. In addition, FIG. 5 is a cross-sectional view taken on line B-B of FIG. 6.

FIGS. 4 to 6 show the condition in which the roller engages with the cam surface, that is, the condition in which the one-way clutch engages under a high load and is locked.

In the event that a load that actuates the clutch is applied in the idling state of FIGS. 1 to 3, the roller 3 energized by the spring 5 engages with the cam surface 12 of the pocket 4. In such an event, the cage 6 rotates with the roller 3 as the roller 3 is moved in the circumferential direction. Consequently, the window 18 moves together with the roller 3.

In such an event, since the roller 3 has one end face in the axial direction supported by the tab 16 of the spring 5 and the other end face by the window 18, the roller 3 can be stably actuated without dropping off in the axial direction.

The roller 3 engages with the outer circumferential surface of the inner race 2 on the circumferential surface slightly protruded from the window 18 to the inside diameter side as soon as the roller 3 engages with the cam surface 12. Consequently, rotations of the outer race 1 and the inner race 2 are locked via the roller 3.

As described above, adopting a construction that provides no rotation stopper to the cage 6 and allows the cage 6 to be rotatable enables the roller 3 itself to move the cage 6 and to move the roller 3 more than the width of the window 18 of the cage 6.

Figure 7:
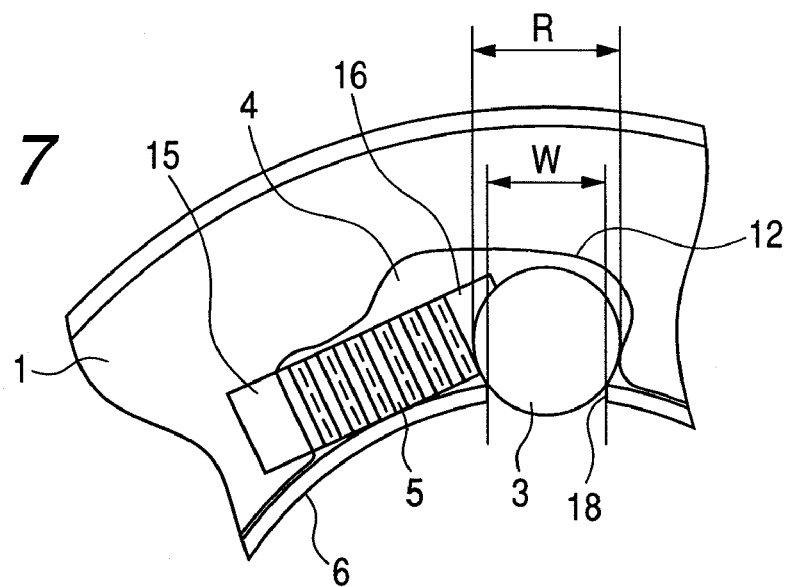
FIG. 7 is a partial front view of the roller-type one-way clutch before mounting an inner race.

FIG. 7 is a partial front view of the roller-type one-way clutch before the inner race is mounted. The roller 3 is energized by the spring 5 and is pressed against the cam surface 12 side but seats on the window 18 of the cage 6 by its dead weight.

As shown in FIG. 7, since the circumferential width W of the window 18 of the cage 6 is made smaller than the diameter R of the roller 3, the roller 3 can be seated on the window 18 without penetrating in the radial direction. Since, as described above, the cage 6 is not fixed to the outer race 1 and the inner race 2, the cage 6 can rotate freely, but since the roller 3 fits into the window 18, when the roller 3 is moved in the pocket 4, the cage 6 rotates also with its movement.

Conventionally, to prevent the roller 3 from dropping off in the radial direction, the roller 3 is attached to the inner race 2 at the time of conveyance and the like. However, if the diameter R of the roller 3 and the circumferential width W of the window 18 of the cage 6 are set as shown on FIG. 7, it is possible to prevent the roller 3 from dropping off in the radial direction only by a cage 6; therefore, there is no necessity for the roller 3 to be attached to the inner race 2 at the time of conveyance.

Figure 8:
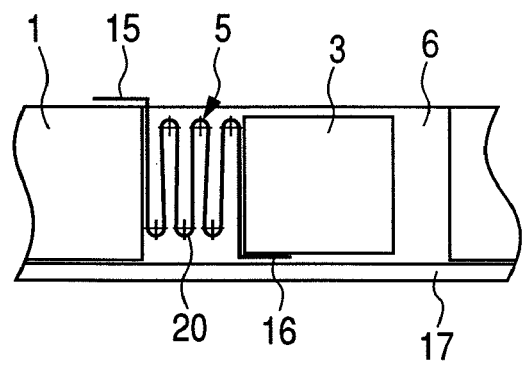
FIG. 8 is a partial side view of FIG. 7 as seen from the inside diameter side.

FIG. 8 is a partial side view of FIG. 7 as seen from the inside diameter side. The spring 5 has a tab 15 bent substantially at right angles from the main body part 20 in the form of an accordion, and this tab 15 engages with one axial end face of the outer race 1. In addition, at the end opposite to the tab 15, a tab 16 which is bent at substantially right angles from the main body part 20 is installed and engages with one axial end face of the roller 3.

The tab 16 which engages with the roller 3 is held between the axial end face of the roller 3 and the flange part 17 of the cage 6. Consequently, the tab 16 holds the roller 3 in the axial direction and at the same time, the spring 5 itself also is supported by the engagement between the outer race 1 and the roller 3. In this way, since the spring 5 is fixed, the spring 5 no longer wobbles in the pocket 4 and wear of the spring 5 can prevented.

Figure 9:
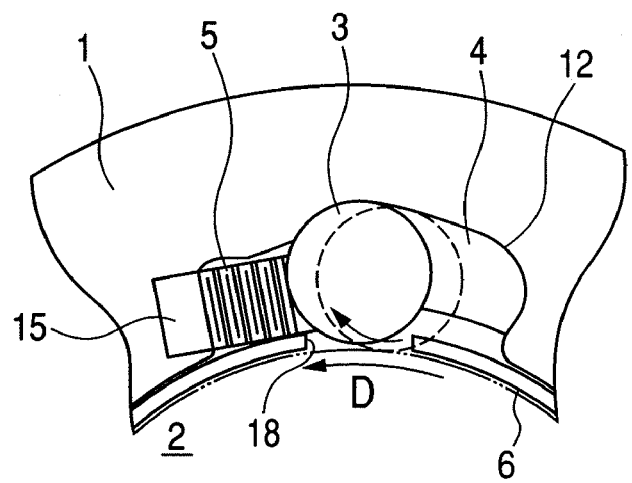
FIG. 9 is a partial front view for explaining the actuation of the roller-type one-way clutch, showing the idling state of the inner race.
Figure 10:
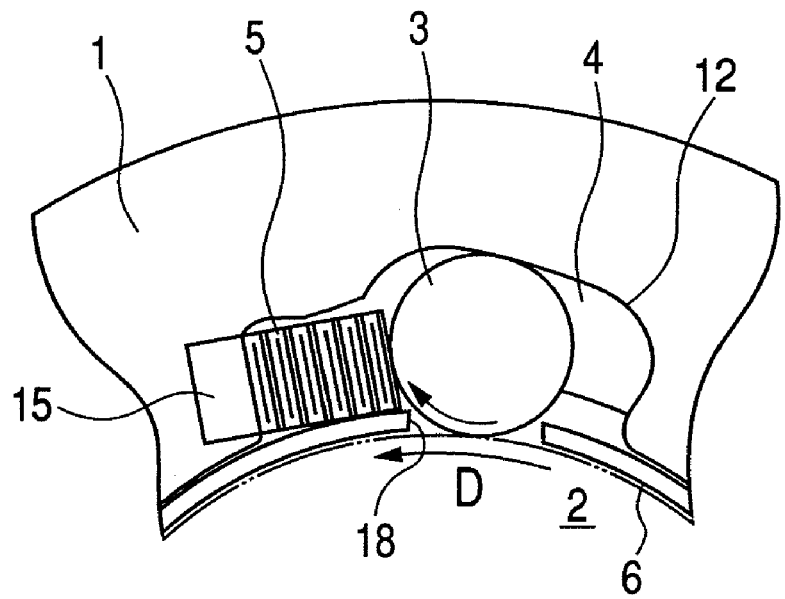
FIG. 10 is a partial front view for explaining the actuation of the roller-type one-way clutch, showing the interval in which the inner race rotates from idling to reversing.
Figure 11:
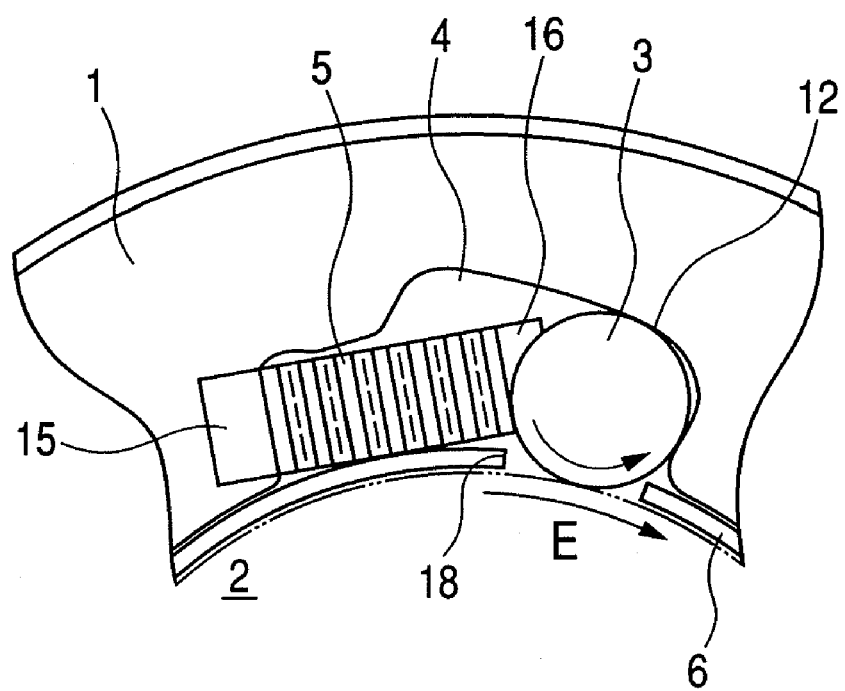
FIG. 11 is a partial front view for explaining the actuation of the roller-type one-way clutch, showing the state in which the inner race reverses.

FIGS. 9 to 11 are partial front views for explaining the actuation of the roller-type one-way clutch, and FIG. 9 shows the state when the inner race is idling, FIG. 10 shows the state when the inner race moves from idling to reversing, and FIG. 11 shows the state when the inner race reverses.

In FIG. 9, the inner race 2 rotates (idles) in the arrow direction. In such an event, by the rotation of the inner race 2, together with the window 18 of the cage 6, the roller 3 moves to the spring 5 side in the pocket 4. That is, since the roller 3 rotates with the cage 6 in the rotating direction of the inner race 2, the roller 3 is moved to the left side in the figure against the energizing force of the spring 5 while rotating on its axis in the arrow direction as illustrated.

FIG. 10 shows the condition in which the rotation (idling) speed in the arrow direction is reduced before the inner race 2 rotates to reverse and the force to move the roller 3 in the left direction in the figure is reduced. In this state, the roller 3 is moved to the cam surface 12 side by the energizing force of the spring 5 but does not engage with the cam surface 12.

When the inner race 2 begins rotation in the direction opposite to that in FIGS. 9 and 10 (the arrow direction of FIG. 11), a load to the roller 3 is eliminated, and the roller 3 is moved to the position to engage with the cam surface 12 by the energizing force of the spring 5 and the movement of the window 18 of the cage 6 which rotates with reverse rotation of the inner race 2. FIG. 11 shows this state. In such an event, the roller 3 rotates with the rotation of the inner race 2 together with the cage 6 and tries to rotate on its axis in the direction as illustrated, and engagement with the cam surface 12 is definitely achieved.

Under the high load state of engaging of FIG. 11, rotation of the inner race 2 is transmitted to the outer race 1 by engaging between the roller 3 and the cam surface 12. That is, the inner race 2 and the outer race 1 are integrated and rotate in the arrow direction.

The tab 16 that engages with the roller 3 may be held between the axial end face of the roller 3 and the flange part 17 of the cage 6.

INDUSTRIAL AVAILABILITY

The present invention is used as a part for torque transmission, back stop or the like in the drive unit of an automobile, industrial machine, or the like, but particularly significant effects can be achieved when it is used for motorcycles.

This application claims the benefit of Japanese Patent Application Nos. 2007-072559, filed Mar. 20, 2007, and 2008-034418, filed Feb. 15, 2008, which are incorporated by reference herein in their entirety.

The invention claimed is:
1. A roller-type one-way clutch, comprising:
  an outer race with a pocket with a cam surface formed on an inner surface;

an inner race separated to a radial inside diameter side with respect to the outer race, disposed concentrically to be relatively rotatable, and having an annular outer peripheral raceway surface;

a plurality of rollers disposed on the pocket, engaged in the cam surface, and transmitting torque between the outer race and the inner race;

a cage provided with a cylindrical part, and a window provided in the cylindrical part, holding the plurality of rollers, and having a circumferential width which is smaller than the roller diameter;

a spring disposed on the pocket, one end of which is latched to the outer race, the other end of which has roller movement preventive means for preventing the movement of the rollers in the axial direction, and which energizes the rollers in the engagement direction with the cam surface, wherein the cage has cage movement preventive means for preventing the cage from dropping off in the axial direction.

2. The roller-type one-way clutch according to claim 1, wherein the roller movement preventive means is an end of the spring which is bent to be in contact with an axial end face of the roller.

3. The roller-type one-way clutch according to claim 1, wherein the one end of the spring is secured to the outer race.

4. The roller-type one-way clutch according to claim 3, wherein the one end is secured to the outer race by welding.

5. The roller-type one-way clutch according to claim 3, wherein the one end is secured to the outer race by soldering.

6. The roller-type one-way clutch according to claim 3, wherein the one end is secured to the outer race by bonding.

7. The roller-type one-way clutch according to claim 4, wherein the one end is secured to the outer race by spot welding.

8. The roller-type one-way clutch according to claim 1, wherein the cage movement preventive means is a flange formed on the cage.

9. The roller-type one-way clutch according to claim 1, wherein the cage movement preventive means is one or more extension parts being extended from the cage to the outside diameter direction.

10. The roller-type one-way clutch according to claim 1, wherein an annular shoulder is installed at the axial edge of the inner circumferential surface of the outer race, and with the shoulder, the cage movement preventive means engages.

11. The roller-type one-way clutch according to claim 1, which is mounted on a relative member at an end face in the axial direction on which the cage movement preventive means is formed.

12. A roller-type one-way clutch, comprising:

an outer race with a pocket that has a cam surface on an inner surface;

an inner race separated to a radial inside diameter side with respect to the outer race, disposed concentrically and relatively rotatable, and having an annular outer peripheral raceway surface;

a plurality of rollers disposed on the pocket, engaged in the cam surface, and transmitting torque between the outer race and the inner race;

a cage provided with a cylindrical part and a flange part extending from the cylindrical part to the outside diameter direction, and having a window provided in the cylindrical part and holding the plurality of rollers; and a spring disposed on the pocket, one end of which is latched to the outer race, the other end of which is held between the roller and the flange part of the cage, and which energizes the roller in the engagement direction with the cam surface, wherein the cage is rotatable relative to the outer race, and the circumferential width of the window is smaller than the roller diameter.

13. The roller-type one-way clutch according to claim 12, wherein the one end of the spring is secured to the outer race.

14. The roller-type one-way clutch according to claim 13, wherein the one end is secured to the outer race by welding.

15. The roller-type one-way clutch according to claim 13, wherein the one end is secured to the outer race by soldering.

16. The roller-type one-way clutch according to claim 13, wherein the one end is secured to the outer race by bonding.

17. The roller-type one-way clutch according to claim 16, wherein the one end is secured to the outer race by spot welding.

18. The roller-type one-way clutch according to claim 12, wherein an annular shoulder is installed at an axial edge of an inner circumferential surface of the outer race, and with the shoulder, the flange part engages.

19. The roller-type one-way clutch according to claim 12, which is mounted on a relative member of an end face in the axial direction on which the flange part is formed.

20. The roller-type one-way clutch according to claim 1, wherein said spring is an accordion spring.

21. The roller-type one-way clutch according to claim 12, wherein said spring is an accordion spring.

\* \* \* \* \*